United States Patent [19]

Russ et al.

[11] 4,233,179
[45] Nov. 11, 1980

[54] PROCESS FOR STEAM REFORMING OF HYDROCARBONS

[75] Inventors: Karl J. Russ, Louisville, Ky.; Donald R. Broughton, Lanesville, Ind.

[73] Assignee: United Catalysts Inc., Louisville, Ky.

[21] Appl. No.: 638,505

[22] Filed: Dec. 8, 1975

[51] Int. Cl.$^2$ ............................................. C01B 3/40
[52] U.S. Cl. ............................. 252/373; 48/214 A; 252/466 J
[58] Field of Search .......... 48/214 A; 252/373, 466 J, 252/471

[56] References Cited

U.S. PATENT DOCUMENTS

| | | | |
|---|---|---|---|
| 3,205,182 | 9/1965 | Padovani et al. | 252/466 J |
| 3,402,022 | 9/1968 | Hayes | 252/466 J |
| 3,410,661 | 11/1968 | Taylor | 48/214 A |
| 3,466,159 | 9/1969 | Warshaw et al. | 252/466 J |
| 3,507,811 | 4/1970 | Davies et al. | 48/214 A |
| 3,533,963 | 10/1970 | Senes et al. | 48/214 A |
| 3,645,915 | 2/1972 | Stiles | 48/214 A |
| 3,701,822 | 10/1972 | Negru et al. | 252/471 |

FOREIGN PATENT DOCUMENTS 314870  1/1931  United Kingdom ................. 48/214 A
460801  2/1937  United Kingdom ................. 48/214 A Primary Examiner—Peter F. Kratz
Attorney, Agent, or Firm—William R. Price

[57] ABSTRACT

A process is provided for the steam reforming of normally liquid hydrocarbons to produce carbon monoxide and hydrogen, which does not promote the deposition of carbonacious materials upon catalytic surfaces. The catalyst consists of nickel promoted with the oxides of iron and manganese within a specific manganese to iron ratio, said metal and metal oxides being supported upon a refractory support. The support is preferably aluminum oxide in its alpha phase having a surface area of more than 0.5 m$^2$/gm but no more than 10 m$^2$/gm. The metallic constituents are impregnated onto said refractory low surface area support as salts and are calcined at sufficiently high temperature to convert the salts to the oxide but at a sufficiently low temperature that they do not chemically react with the support.

7 Claims, 1 Drawing Figure

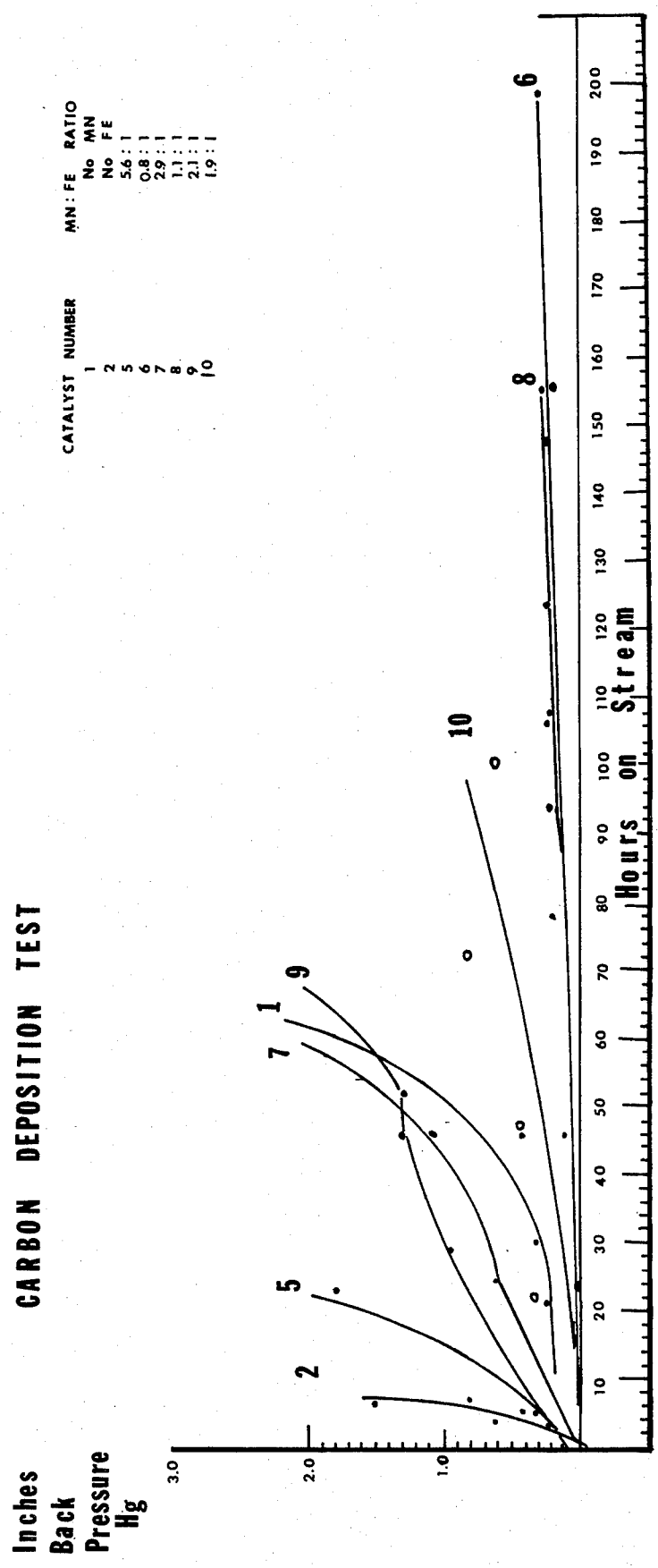

PROCESS FOR STEAM REFORMING OF HYDROCARBONS

BACKGROUND OF THE INVENTION

The invention relates to the steam reforming of normally liquid hydrocarbons. This invention contemplates the use of a catalyst for the high temperature reaction between steam and normally liquid hydrocarbons (boiling in the naphtha range) to produce hydrogen and carbon oxides.

1. Field of the Invention

This invention relates to the provision of a catalyst which is essentially resistant to the deposition of carbon during the high temperature reaction of long chain hydrocarbons with steam to form carbon monoxide and hydrogen. The steam reforming reaction is well known and does not promote normally the deposition of carbon so long short chain hydrocarbons such as methane and ethane are utilized. However, when the naphthas are utilized as the feed material, a problem of deposition of carbon on the catalyst surfaces occurs. This invention provides a catalyst which is active for the reaction, but which does not promote deposition of carbon. This catalyst comprises nickel, promoted with the oxides of manganese and iron on a low surface area refractory support. The catalyst is characterized by the fact that the metallic constituents are not chemically combined with the refractory support and by the fact that the refractory support has a specific surface area.

2. Description of the Prior Art

The constituents comprising the catalyst of this invention have been known for many years as promoters and as catalytically active agents for reforming catalysts. The use of manganese, for example, was recognized as early as 1930 by Raymond Benner and Alfred Thompson of General Chemical Company as a strengthening and hardening constituent for activated bauxite as disclosed in their U.S. Pat. No. 1,778,517. The use of alkaline and alkaline earth metals in conjunction with nickel cobalt or iron group catalysts utilized in conjunction with carriers such as manganesium or aluminum oxide was disclosed as early as 1926 in British Pat. No. 267,535 to I. G. Farbinindustrie, A. G. Williams, of DuPont in U.S. Pat. No. 1,736,065 recognized the use of aluminum oxide, manganese oxide, potassium oxide and calcium oxide among others as promoters for the nickel catalyst utilized in the production of hydrogen by the reaction of steam and gaseous hydrocarbons. Incorporation of an alkali earth oxide into a catalyst comprising nickel and a fused alumino-silicate refractory was disclosed by Fremuth as early as 1934 in U.S. Pat. No. 1,970,695. More recently, Warshaw, et al., in U.S. Pat. No. 3,446,159 suggested the use of a manganese promoted nickel catalyst for the conversion of liquid hydrocarbons to methane. This catalyst was prepared by coprecipitation of alumina, nickel and manganese from a solution of their respective nitrates. The patent to Padovani, et. al., U.S. Pat. No. 3,205,182 in 1965 suggested a catalyst supported on a refractory support and comprising a metallic oxide which included the oxides of manganese and iron. However, in this case, Padovani required that the support and the metallic oxides be calcined at temperatures in the range of 1200 to 1400 degrees C. for 24 hours so as to react the oxides with the supports and therefore prevent blockage of the catalytically active nickel constituents subsequently incorporated onto the carrier. Taylor and Sinfeld in a series of U.S. Pat. Nos. 3,320,182; 3,394,086; 3,404,100; and 3,407,149, all of Esso Research and Engineering Company have shown the advantages of the various promoters and specifically the advantage of barium in relation to a catalyst for the production of a methane rich gas from naphtha. All of these catalysts, however, are of high surface area type. The patentees, for example, in U.S. Pat. No. 3,320,182, point out that barium produces the best activity maintenance of all the promoters utilized. Thus, for example, it was stated that barium reduced the surface area less, i.e., from 190 $m^2/gm$, unpromoted to 140 $m^2/gm$ promoted, whereas potassium reduced the surface area from 190 to 110 $m^2/gm$. Essentially, the same catalyst, in U.S. Pat. No. 3,394,086 was utilized for the steam reforming of naphtha hydrocarbon to produce a hydrogen rich gas. However, this catalyst had a surface area from 100 to 300 $m^2/gm$ and a nickel surface area of from 5 to 20 $m^2/gm$.

SUMMARY OF THE INVENTION

We have found that it is not only essential to closely control the catalytic constituents of the catalyst in processes involving the high temperature reforming of normally liquid hydrocarbons, but that the specific method of preparation of the catalyst in some way influences the propensity of the catalyst to promote carbon formation. First, it is essential that the surface area of the carrier be low, i.e., greater than 0.5 $m^2/gm$, but no more than 10 $m^2/gm$. Secondly, it is preferable to utilize the oxides of alumina in the alpha phase as the support for the carrier. Thirdly, it is essential that the catalytic materials be impregnated onto the carrier from a solution of their salts containing cations which do not poison the eventual catalyst. Thereafter, it is essential that the metallic salts be calcined at such a temperature that the salts are converted to the oxides, but below the temperature at which the metallic oxides would go into solid solution or chemically combine with the low surface area catalyst support. Further, as will be shown in the data, we have found that the relationship of iron to manganese (expressed as the metal) is extremely critical as the promoting elements to stabilize and inhibit carbon formation with the nickel catalyst. Further, the addition of a barium constituent to the low surface area catalyst as a promoter is extremely effective in inhibiting carbon formation. Further, the sequence of steps in which the salts are impregnated onto the carrier appear to have an influence on the catalyst activity and on its ability to inhibit carbon formation.

DESCRIPTION OF THE PREFERRED EMBODIMENT

The catalyst comprises catalytically active metals deposited on a low surface area refractory carrier. The carrier, is a preferred embodiment, consists of hydrated alumina and transitional alumina which have been tableted into rings or pellets and thereafter calcined at a temperature in the range of from 2000 to 3200 degrees F. for a period of up to 24 hours in order to convert all of the alumina to the alpha phase. The finished carrier than has a surface as measured by nitrogen adsorption of from 0.5 to 10 $m^2/gm$. Optionally, commercially available carriers comprising fused alpha alumina can be utilized. The catalytically active constitutents are impregnated onto the refractory carrier from a solution of heat decomposable salts. The salt must have a cation which is heat decomposable and which will not poison the eventual catalyst. Preferred water soluble salts are the nitrates or acetates. After the impregnation step, the catalyst is calcined at a temperature in the range of from 700° F. to 1200 degrees F. with periods of 2 to 16 hours. The calcination should be sufficient to convert the salts to the oxides without putting the metal oxides into solid solution with the carrier or chemically combining the metal salts with the carrier.

The water soluble salts are added in such a concentration so that after calcination and reduction, the metals will be present as follows:

| Metal | Percent by Weight of Catalyst Including Support (expressed as the metal) | Preferred Range |
|---|---|---|
| Nickel | 5 40 to 30 percent | 8 to 20 percent |
| Manganese | 0.5 to 5 percent | 0.5 to 2 percent |
| Iron | 0.5 to 10 percent | 1 to 3 percent |

In a preferred embodiment, barium is added to aid in the prevention of carbon deposition on the catalyst.

The sequence of impregnation of the salts onto the carrier may be from a single solution of the acetates and nitrates of nickel manganese, iron and barium. Alternately, the manganese constituent may be first impregnated onto the carrier and calcined followed by impregnation from a solution containing the salts of nickel and iron. Alternately, the iron salt may be first impregnated onto the carrier followed by calcination and a subsequent impregnation from a solution containing the salts of nickel and manganese. Alternately, the barium salt may be added by a subsequent impregnation step. However, in no case, should the manganese salt be added on top of the nickel and iron constituents, nor should the iron constituents be added on top of the manganese or nickel constituents.

The process conditions employed in the steam reforming of hydrocarbons is dependent upon the intended use of the end products. The catalyst of this invention will operate, however at low to high steam to carbon molar ratios, of 1.5 to 5; at low to high pressures, of from 0 to 50 atmospheres at temperatures in the range of from 800 degrees F. to 1800 degrees F.

EXAMPLE 1

Catalyst A

Catalyst A was prepared by immersing the high temperature treated alumina rings in a solution of potassium nitrate to obtain a potassium concentration of 0.3 percent potassium. These rings were calcined three hours at 1000° F. The rings were allowed to cool and then they were dipped in a solution of nickel nitrate. The impregnated catalysts were then calcined for three hours at 1000° F. The rings were allowed to cool and redipped in a nickel nitrate solution and recalcined in subsequent steps until a total of four dips was accomplished. The finished catalyst had the following composition:

| 14.2 percent | Nickel |
|---|---|
| 0.3 percent | Potassium |
| Surface area | 10 m²/gm |

EXAMPLE 2

Catalyst B

Catalyst B was prepared by dipping the heat treated alumina rings as described in Example 1 in a solution of 1500 cc. of Ni(NO$_3$)$_2$ containing 19.5 grams of nickel per 100 cc. and 480 grams of Mn(NO$_3$)$_2$ solution containing 55 percent Mn(NO$_3$)$_2$. The rings were then calcined at 1000 degrees F. for three hours. The dipping and calcination procedure was repeated five times. The finished catalyst had the following composition:

| 11.7 percent | Nickel |
|---|---|
| 3.3 percent | Manganese |
| Surface area | 10 m²/gm |

EXAMPLE 3

Catalyst C

Catalyst C was prepared by dipping the alumina rings of the previous example in a solution containing 1600 cc. of Ni(NO$_3$)$_2$ containing 20 grams of nickel per 100 cc. of solution and 290 grams of Fe(NO$_3$)$_3$.9H$_2$O solution dissolved in 300 cc. of water. The rings were dipped in the above solution three times and thereafter calcined at 1000° F. after each dip. The catalyst had the following composition:

| 8.73 percent | Nickel |
|---|---|
| 0.85 percent | Iron |
| Surface area | 10 m²/gm |

EXAMPLE 4

Catalyst D

Alumina rings as used in Catalysts B and C were dipped in a solution containing 1600 cc. of Ni(NO$_3$)$_2$ containing 19.8 grams of nickel per 100 cc. of solution, 290 grams of Fe(NO$_3$)$_2$.9H$_2$O and 362 grams of 55 percent Mn(NO$_3$)$_2$ solution. The rings were dipped four times and calcined at 1000 degrees F. for three hours between each dip. The catalyst composition of the finished catalyst D was:

| Nickel | 10.3 percent |
|---|---|
| Manganese | 1.55 percent |
| Iron | 1.12 percent |
| Surface area | 10 m²/gm |

Each of the catalysts was activity tested by passing over the catalysts a mixture of the desulfurized naphtha (boiling range of 78° F.–368° F.) and steam (steam:carbon ratio of 2.6:1) and at a pressure of 600 PSIG. The inlet temperature was maintained at 700° F. to 850° F. at an outlet temperature of 1100° F. to 1450° F. with a theoretical hydrogen hourly space velocity of 2000.

TABLE A

Activity Test Results

| Catalyst | % Ni | % Mn | % Fe | % K | Inlet Temp. | Outlet Temp. | % CH$_4$ | Hours on Stream | Comments |
|---|---|---|---|---|---|---|---|---|---|
| A | 14.2 | 0 | 0 | 0.3 | 802° F. | 1430° F. | 22 | 48 | Heavy carbon |
| B | 11.7 | 3.3 | 0 | 0 | 852° F. | 1457° F. | 26.3 | 48 | Med. carbon |
| C | 8.7 | 0 | 0.85 | 0 | 802° F. | 1204° F. | 35.4 | 94 | Very light carbon |
| D | 10.3 | 1.55 | 1.12 | 0 | 675° F. | 1108° F. | 37.2 | 46 | Traces of carbon |

Based on these activity test results, catalyst D was superior to: Catalyst A (Nickel-Potassium promoted); Catalyst B (Nickel-Manganese); and to Catalyst C (Nickel-Iron). In other words, the combination of nickel, manganese and irom seemed to produce a synergistic effect on the ability of the catalyst to inhibit carbon formation. It should be noted that the inlet temperature and outlet temperature for catalyst D was substantially lower than the inlet and outlet for any of the other catalysts. Of course, the lower temperatures tend to favor carbon formation.

In order to characterize the optimum manganese to iron ratio, further studies were made with a series of catalysts prepared by sequential impregnation of the alpha-alumina rings previously described herein with a solution of the metallic nitrates followed by calcination until a desired concentration was formed. A rapid carbon deposition test developed by Imperial Chemical Industries of London, England and described in their U.S. Pat. No. 3,334,055, was utilized to characterize the carbon-forming propensities of these catalysts. According to these tests, the heavy carbon deposition should occur within a relatively short time of two to ten hours. The test conditions are as follows:

| | |
|---|---|
| Pressure | Atmospheric |
| Temperature | 1140° F. |
| Liquid hourly space velocity | 9 |
| Steam to carbon ratio | 2:1 |
| Catalyst volume | 10 cc. |
| Catalyst size | 3/16 inch × ¼ inch ring |
| Feed | Naphtha (B.P. 78° F. to 368° F.) |

Normally, the test is stopped after a back pressure of two inches of mercury is reached as measured on a mercury manometer. Pressure drop is caused by carbon build up on the catalyst.

The activity test data is tabulated in Table B.

TABLE B

| Catalyst Designation | % Ni | % Mn | % Fe | Mn:Fe Ratio | Hours on Stream | Back Pressure Inches of Hg |
|---|---|---|---|---|---|---|
| 1 | 8.7 | 0 | 0.85 | 0 | 69.5 | 5.5 |
| 2 | 14.2 | 3.4 | 0 | 0 | 7.2 | 1.5 |
| 3 | 9.5 | 1.87 | 1.02 | 1.83 | 27.1 | 2.5 |
| 4 | 14.6 | 0.94 | 1.28 | 0.73 | 76 | 2.2 |
| 5 | 11.7 | 3.48 | 0.62 | 5.6 | 27 | 4.5 |
| 6 | 8.44 | 2.27 | 2.83 | 0.80 | 199 | 0.3 |
| 7 | 7.05 | 3.35 | 1.17 | 2.85 | 69.2 | 4.5 |
| 8 | 9.88 | 2.44 | 2.18 | 1.12 | 154.5 | 0.2 |
| 9 | 18.0 | 3.05 | 1.47 | 2.08 | 71 | 2.4 |
| 10 | 7.78 | 2.13 | 1.13 | 1.88 | 100 | 0.6 |

There is a trend of improved catalyst performance with the decrease in manganese to iron ratio. This is shown in the attached graph in which catalysts 1, 2, 5, 6, 7, 8, 9, and 10 have been plotted as hours on stream versus inches of mercury back pressure. It should be pointed out that the comments and the table B may be somewhat confusing since the carbon formation indicated is at the end of the run which varies in time on stream from 7.2 hours to 176 hours. It should be pointed out that this test was purposely created for the deposition of carbon on the catalyst and was intended to run for only a short period of time of from two to ten hours. However, we have shown in these runs, catalysts capable of running from 150 to 199 hours or more without appreciable high mercury back pressure.

The graph attached hereto shows, for example, a critical manganese to iron ratio of less than 2:1. Note, for example, that catalyst 10, having a manganese to iron ratio of 1.9:1 had a back pressure of less than one inch mercury at the end of almost 100 hours whereas catalyst 9 having a manganese-iron ratio of 2.1:1 had a back pressure of 2 inches of mercury after 60 hours of operation.

It will also be noted that catalyst 9 was equivalent in carbon forming propensity to catalyst 1 which contained no manganese; or catalyst 7 which had a manganese to iron ratio of 2.9:1. It does appear clear that the manganese to iron ratio of less than 2:1 is critical. Note that catalyst 6, having a manganese to iron ratio of 0.8 ran for almost 200 hours with less than one half inch of back pressure of mercury. Note also that catalyst 8 having a manganese to iron ratio of 1:1 was essentially equivalent in lack of back pressure of mercury to catalyst 6 running far in excess of 150 hours with less than one-half inch of mercury back pressure.

EXAMPLE 5

A series of four catalysts were prepared under essentially the same conditions as those shown in example 4 so as to have the same nominal nickel manganese and iron composition. However, in one of the tests, the alumina ring carrier was substituted for a commercially available alpha-alumina carrier having a surface area in the same general range of 10 m$^2$/gm and the catalysts designated as 13 and 14 were substantially impregnated in a potassium nitrate solution and a barium acetate solution respectively and calcinedso as to produce the catalyst containing 0.4 percent potassium for catalyst 13 and 1.7 percent barium for catalyst 14. These catalysts were tested again under the same general conditions as those previously reported, however, due to the severity of the tests in some cases the pressure was reduced to 450 PSIG and the steam to carbon ratio was increased from 2.6 to 3.0. The results of this run are shown in Table C.

TABLE C

| Catalyst Run | Catalyst Description | | | | Pres. | S:C Ratio | Methane Outlet Final | Days On Stream | Comments |
|---|---|---|---|---|---|---|---|---|---|
| | % Ni | % Mn | % Fe | % promoter | | | | | |
| 11 | 10.8 | 1.14 | 1.34 | 0 | 600 | 2.6 | 29.4 | 15.8 | Very heavy carbon |
| 12 | 9.4 | .93 | 1.22 | 0 | 600 | 2.6 | 30.4 | 10.8 | Carbon formation, heavy tars |
| 13 | 10.0 | 1.08 | 1.13 | 0.4K | 450 | 3.0 | 26.3 | 30 | Heavy carbon |
| 14 | 10.8 | 1.14 | 1.34 | 1.7Ba | 450 | 3.0 | 25.6 | 30 | Med. to Lt. carbon |
| 15* | 10.8 | 1.14 | 1.34 | 1.70Ba | 600 | 2.6 | 29.2 | 18 | Med. to Light |

*Catalyst from run 14 was recharged under more severe conditions.

It will be noted from the above that the barium promoted catalyst was superior in inhibiting carbon fromation both to the unpromoted nickel manganese iron catalyst of this invention and to the same catalyst promoted with potassium.

Previously, the teaching in the art was to the effect that potassium was the superior carbon inhibitor and in fact potassium is almost exclusively used commercially.

We have found that the carriers utilized should be aluminum oxide in the alpha phase having a surface area of more than 0.5 m²/gm and not more than 10 m²/gm. We have also found that the heat treatment of the metallic salts onto this carrier should be such that spinel formation does not occur so that the metallic promoters do not combine chemically or physically with the aluminum oxide carrier.

Further, we have found that despite teachings in the art that the use of barium oxide to promote catalysts was to prevent the reduction of surface area, that the barium oxide produces a synergistic effect in the reduction of carbon deposition on the catalyst even when the initial surface area of the catalyst is extremely low. In other words, we have found that the surface area of the catalyst should be within the well-specified limits, that the manganese to iron ratio should be well within specified limits, and that the barium oxide concentration on the catalyst additionally provides an impediment to the formation of carbon thereon. Further, the barium oxide does not migrate as is the case with the alkali metals and cause problems downstream of the steam reformer.

It should be apparent that many modifications will occur to those skilled in the art from the detailed description hereinabove given and such description is meant to be exemplary in nature and nonlimiting except so as to be commensurate in scope with the appended claims.

We claim:

1. A process for the steam reforming of normally liquid hydrocarbons to produce hydrogen and the oxides of carbon which comprises the steps of:
   A. passing said normally liquid hydrocarbons and steam at a ratio of about 1.5 to about 5 mols of steam per atom of carbon in said normally liquid hydrocarbons and at a pressure in the range of from about 1 to 50 atmospheres and at a temperature in the range of from 800 to 1800 degrees F. over a catalyst comprising catalytically active constituents for said reaction impregnated onto a low surface area refractory support
   B. the improvement in which said catalytically active constituents comprise nickel, expressed as the metal, in a weight concentration of from about five to thirty percent and promotional amounts of the oxides of manganese and iron, in which the ratio of manganese to iron, expressed as the metal, does not exceed 2:1 and in which:
      1. said catalytically active constituents are not chemically bound to said refractory support, having been impregnated onto said low surface area refractory support from a solution of their heat decomposable water soluble salts, followed by calcination at a temperature of at least 700° F. but not in excess of 1200° F. for sufficient time to convert each of said salts to the oxide.
2. The process, as defined in claim 1, in which,
   A. said refractory support comprises the oxides of aluminum in its alpha phase.
3. The process, as defined in claim 1, in which said refractory support has a surface area as measured by nitrogen adsorption of from 0.5–10.0 square meters per gram.
4. The process, as defined in claim 1, in which the ratio of manganese to iron on said catalyst is in the range of from 0.5:1 to 2:1.
5. The process, as defined in claim 1, in which the manganese is present in a weight concentration, expressed as the metal, of from 0.5–5.0 percent by weight.
6. The process, as defined in claim 1, in which the iron is present in a weight concentration, expressed as the metal, of from 0.5–10 percent.
7. A process, as defined in claim 1, the further improvement of a promoter for said catalytically active constituent comprising barium oxide.

* * * * *